(12) United States Patent
Miyaji et al.

(10) Patent No.: US 10,190,649 B2
(45) Date of Patent: Jan. 29, 2019

(54) FRICTION MATERIAL

(71) Applicant: AKEBONO BRAKE INDUSTRY CO., LTD., Tokyo (JP)

(72) Inventors: Motoyuki Miyaji, Tokyo (JP); Katsumi Shibuya, Tokyo (JP); Takayuki Watanabe, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/034,600

(22) PCT Filed: Nov. 11, 2014

(86) PCT No.: PCT/JP2014/079810
§ 371 (c)(1),
(2) Date: May 5, 2016

(87) PCT Pub. No.: WO2015/072440
PCT Pub. Date: May 21, 2015

(65) Prior Publication Data
US 2016/0273604 A1    Sep. 22, 2016

(30) Foreign Application Priority Data
Nov. 12, 2013   (JP) .................. 2013-234268

(51) Int. Cl.
*F16D 69/02* (2006.01)
*C08K 3/08* (2006.01)
*C08K 3/22* (2006.01)
*C08K 7/02* (2006.01)

(52) U.S. Cl.
CPC ............. *F16D 69/026* (2013.01); *C08K 3/08* (2013.01); *C08K 3/22* (2013.01); *C08K 7/02* (2013.01); *F16D 69/028* (2013.01); *C08K 2003/0893* (2013.01); *C08K 2003/2206* (2013.01); *F16D 2200/006* (2013.01); *F16D 2200/0026* (2013.01); *F16D 2200/0056* (2013.01); *F16D 2200/0069* (2013.01)

(58) Field of Classification Search
CPC .................................................. F16D 69/026
USPC ....................................................... 523/155
See application file for complete search history.

(56) References Cited

U.S. PATENT DOCUMENTS

| | | | | |
|---|---|---|---|---|
| 4,448,921 A | * | 5/1984 | Yamaya ................. | C04B 26/20 524/443 |
| 5,576,358 A | * | 11/1996 | Lem ...................... | B29C 43/006 204/155 |
| 6,887,549 B2 | | 5/2005 | Suzuki et al. | |
| 8,863,917 B2 | | 10/2014 | Subramanian | |
| 9,039,825 B2 | | 5/2015 | Unno et al. | |
| 9,086,105 B2 | | 7/2015 | Unno et al. | |
| 9,410,591 B2 | | 8/2016 | Unno et al. | |
| 9,464,682 B2 | | 10/2016 | Unno et al. | |
| 9,464,683 B2 | | 10/2016 | Baba et al. | |
| 9,470,283 B2 | | 10/2016 | Unno et al. | |
| 2004/0265557 A1 | * | 12/2004 | Suzuki ................. | F16D 69/026 428/292.1 |
| 2010/0084232 A1 | | 4/2010 | Subramanian | |
| 2010/0233464 A1 | * | 9/2010 | Unno .................... | F16D 69/026 428/323 |
| 2011/0297496 A1 | | 12/2011 | Subramanian | |
| 2012/0070680 A1 | | 3/2012 | Unno et al. | |
| 2013/0096228 A1 | * | 4/2013 | Yamamoto ............ | F16D 69/028 523/155 |
| 2013/0220746 A1 | | 8/2013 | Unno et al. | |
| 2013/0240310 A1 | | 9/2013 | Baba et al. | |
| 2013/0256938 A1 | * | 10/2013 | Kobayashi ............ | F16D 69/025 264/109 |
| 2014/0202805 A1 | | 7/2014 | Unno et al. | |
| 2014/0227541 A1 | | 8/2014 | Unno et al. | |
| 2014/0342899 A1 | | 11/2014 | Itami et al. | |
| 2015/0008615 A1 | | 1/2015 | Unno et al. | |
| 2016/0265612 A1 | | 9/2016 | Unno et al. | |

FOREIGN PATENT DOCUMENTS

| | | |
|---|---|---|
| CA | A-1208896 | 8/1986 |
| CN | 102449098 A | 5/2012 |
| CN | A-102713334 | 10/2012 |
| CN | 103119120 A | 5/2013 |
| EP | A1-2641956 | 9/2013 |
| JP | A-S56-161428 | 12/1981 |
| JP | H03-210338 A | 9/1991 |
| JP | A-H07-109362 | 4/1995 |
| JP | A-2000-205318 | 7/2000 |
| JP | 2005-015576 A | 1/2005 |
| JP | 2005-036939 A | 2/2005 |

(Continued)

OTHER PUBLICATIONS

JP Office Action dated Dec. 20, 2016 from corresponding Japanese patent application No. 2013-234268 (with attached English-language translation).
CN Office Action dated Dec. 29, 2016 from corresponding Chinese patent application No. 201480061703.3 (with attached English-language translation).
Patent Translation of Friction Materials for Brake and Clutch, based on JP-A-S58-034885.
Extended European Search Report dated May 23, 2017 in corresponding European patent application 14862187.3 (6 pages).
CN Office Action dated Jun. 28, 2017 from corresponding Chinese patent application No. 201480061703.3 (with attached English-lanuse translation).
JP Office Action dated Aug. 29, 2017 from corresponding Japanese patent application No. 2013-234268 (with attached English-language translation).

*Primary Examiner* — Doris L Lee
(74) *Attorney, Agent, or Firm* — Drinker Biddle & Reath LLP

(57) ABSTRACT

This friction material contains a fiber base material, a friction modifier and a binder. The content of copper in the friction material is not more than 0.5 mass % in terms of elemental copper, and the content of the binder is at least 10 mass %. Furthermore, the friction material contains calcium hydroxide and zinc, and has a pH of at least 11.7.

9 Claims, No Drawings

(56) References Cited

FOREIGN PATENT DOCUMENTS

| | | |
|---|---|---|
| JP | 2006-290938 A | 10/2006 |
| JP | 2007-084643 A | 4/2007 |
| JP | A-2012-255053 | 12/2012 |
| JP | A-2013-076058 | 4/2013 |
| JP | 2013-129801 A | 7/2013 |
| WO | WO 2011-0158917 * | 12/2011 |
| WO | WO 2012/077499 * | 6/2012 |
| WO | WO-2013/048627 A1 | 4/2013 |

* cited by examiner

FRICTION MATERIAL

TECHNICAL FIELD

The present invention relates to a friction material to be used for passenger automobiles, railway vehicles, industrial machines and the like, and particularly to a friction material which is improved in seizure resistance due to corrosion and is environmentally friendly because of using substantially no copper metal and no copper metal compound.

BACKGROUND ART

Conventionally, a friction material to be used for brakes and the like has been produced by using a fiber base material, a friction modifier, a filler and a binder, blending them, and performing a production process including steps such as preforming, thermoforming and finishing. In the friction material to be used for brakes and the like, there have been used the fiber base material such as organic fiber such as aramid fiber, inorganic fiber such as glass fiber, or metal fiber such as copper fiber, the organic/inorganic friction modifier such as rubber dust, cashew dust, metal particles, ceramic particles or graphite, the filler such as calcium carbonate or barium sulfate, and the binder such as a phenol resin.

However, for example, in the case of a disc pad, there is a possibility to cause the partial generation of rust on a rotor side thereof in contact with the friction material during parking because of the interposition of water. The rotor and the disc pad are seized to each other by the rust which is partially generated on the rotor, and seizure force due to corrosion causes the occurrence of noise at the time of starting.

A cause for the generation of the rust is that the rotor is placed under an acidic environment, and from the viewpoint of materials of the friction material, low-pH raw materials are considered to be contained. As a method for eliminating the influence of such corrosion accelerating substances from the friction material, calcium hydroxide or the like is sometimes blended for the purpose of pH control.

For example, Patent Document 1 describes a friction material obtained by forming and curing a friction material composition mainly including a fiber base material, a binder and a filler, in which an alkaline raw material having pH of 11.0 or more, such as hydrated lime, is added to control the pH of the whole friction material, the amount of sulfate ions eluted from the friction material, which is measured according to JIS K 0127, is 0.2 mg/g or less, and the pH of the friction material is 10.0 or more and less than 13.0.

Further, Patent Document 2 discloses a friction material to be used in combination with a sliding member made of an aluminum-based metal composite material, in which the hydrogen ion concentration of the friction material is from pH 6 to 10, and the electric resistance value thereof is 300 kΩ or more. However, it is mentioned that in order to control the pH of the friction material to the range as described above, as an inorganic filler, an inorganic filler having pH of 12 or more, for example, calcium hydroxide, is preferably blended in an amount of 1% by volume or less.

Furthermore, Patent Document 3 describes that in a friction material for a small-sized brake lining (small-sized BL), both of a Morning Effect and the generation of 'Groan' noise after standing under a high-humidity environment after high-temperature thermal history are prevented at the same time by a friction material containing at least from 7% by volume to 30% by volume of hydrated lime as a filler and from 2.0% by volume to 3.5% by volume of aluminum particles.

Patent Document 4 describes an efficient production method of a friction material including a mixing step of stirring raw materials of the friction material while suppressing a rapid increase in viscosity during mixing the raw materials of the friction material containing a phenol resin, calcium hydroxide and water, and a forming step of forming a mixed powder obtained in the mixing step into a desired shape.

On the other hand, in the case of a non-asbestos friction material, in order to improve fade resistance, metal having a high thermal conductivity, particularly copper fibers or copper particles are added in some cases.

A fade phenomenon is caused by decomposition gas generated when organic substances contained in the friction material are decomposed at high temperature under high load, and heat radiation properties of the friction material itself are improved by adding copper having a high thermal conductivity to the friction material, thus being able to suppress the generation of the decomposition gas.

In recent years, however, from concerns about environmental pollution such as river or sea pollution and adverse effects on human body, it has been desired to develop a friction material containing no heavy metal such as copper.

PRIOR ART DOCUMENTS

Patent Documents

Patent Document 1: JP-A-2005-15576
Patent Document 2: JP-A-2006-290938
Patent Document 3: JP-A-2007-84643
Patent Document 4: JP-A-2013-129801

SUMMARY OF THE INVENTION

Problem that the Invention is to Solve

When copper is removed, a reinforcing effect by copper fiber is lost, so that there is a concern about a decrease in strength of the friction material. The friction material sticks to a rotor by the decrease in strength of the friction material, resulting in easy generation of rust on a rotor surface. However, in the friction material containing no copper component, it has been difficult to achieve the compatibility between securing of the strength of the friction material and suppression of rusting.

Accordingly, an object in the present invention is to provide a friction material which suppresses the generation of rust caused by sticking of the friction material, has sufficient strength of the friction material without using copper fiber as a reinforcing material, and contains substantially no copper component.

Means for Solving the Problem

In order to solve the above-mentioned problem, the present inventors have made intensive studies. As a result, it has been found that the strength of the friction material can be secured to suppress the generation of rust caused by the friction material by adjusting the content of a binder to 10% by mass or more, blending calcium hydroxide and zinc and setting the pH of the friction material to 11.7 or more, even when copper is not substantially contained, thus leading to completion of the present invention.

That is, an object in the present invention could be achieved by the following (1) to (3).

(1) A friction material including a fiber base material, a friction modifier and a binder, wherein a content of copper is 0.5% by mass or less in terms of copper element, a content of the binder is 10% by mass or more, and the friction material contains calcium hydroxide and zinc, and has pH of 11.7 or more.

(2) The friction material according to (1), wherein a content of the calcium hydroxide is from 2% by mass to 6% by mass.

(3) The friction material according to (1) or (2), wherein a content of the zinc is from 1% by mass to 5% by mass.

Advantageous Effects of the Invention

In a friction material in the present invention, the strength of the friction material can be secured by adjusting the resin amount of a binder to 10% by mass or more based on the whole friction material, even when copper is not substantially contained. Further, the friction material dramatically improved in rust preventing performance has been obtained by adding calcium hydroxide and zinc to the friction material, and in addition, controlling the pH to 11.7 or more. As a result, a decrease in seizure force due to corrosion (sticking property) and a reduction in noise can be realized by the friction material in the present invention, even when no copper fiber is contained.

MODE FOR CARRYING OUT THE INVENTION

Modes for carrying out the present invention will be described in detail below. However, the following embodiments are only examples, and the present invention should not be construed as being limited thereto.

In this description, "% by mass" and "% by weight" have the same meanings.

In a friction material in the present invention, a copper component is not substantially contained in the friction material. Here, "a copper component is not substantially contained" means that a copper component is not contained as an active substance for exhibiting functions such as abrasion resistance, and does not mean that, for example, a copper component as an impurity or the like inevitably slightly contained in the friction material is not contained. Specifically, it means that the content thereof is 0.5% by mass or less based on the whole amount of the friction material. Examples of the copper components also include copper itself, copper alloys of copper and other metals such as zinc, nickel, manganese, aluminum or tin, and copper compounds such as copper oxides and copper sulfides.

In the blending for the friction material, materials usually employed are used, as long as they are in accordance with the spirit of the present invention. As fiber base materials for reinforcement, examples thereof include organic fibers, inorganic fibers, metal fibers and the like. However, copper component-containing copper fiber, bronze fiber and brass fiber are not used.

As the organic fibers, examples thereof include aromatic polyamide (aramid) fiber, flame-resistant acrylic fiber, cellulose fiber and the like, and these may be used individually or in combination of two or more kinds thereof.

Examples of the inorganic fibers include ceramic fibers such as potassium titanate fiber and alumina fiber, glass fiber, carbon fiber, rock wool and the like, and examples of the metal fibers include steel fiber and the like. These may be used individually or in combination of two or more kinds thereof.

As the inorganic fiber to be used in the present invention, bio-soluble inorganic fiber is preferred from the point of a small influence on human body. The bio-soluble inorganic fiber mentioned herein means an inorganic fiber having a feature that even when incorporated into human body, it is decomposed in a short period of time and eliminated from the body. Specifically, it indicates an inorganic fiber satisfying that the total amount of alkali metal oxides and alkaline earth metal oxides (the total amount of oxides of sodium, potassium, calcium, magnesium and barium) is 18% by mass or more in a chemical composition thereof, that the mass half-life of the fiber of 20 µm or more is within 40 days in a respiratory short-term biodurability test, and that there is no evidence of excessive carcinogenicity in an intraperitoneal test, or that there is no relating pathogenicity or tumor occurrence in a long-term respiration test (Note Q (exclusion from application of carcinogenicity) of EU directive 97/69/EC).

Examples of such bio-soluble inorganic fiber include bio-soluble ceramic fiber and bio-soluble rock wool, such as $SiO_2$—CaO—MgO-based fiber, $SiO_2$—CaO—MgO—$Al_2O_3$-based fiber and $SiO_2$—MgO—SrO-based fiber, and the like.

The content of the fiber base material is preferably from 5% by mass to 50% by mass, and more preferably from 5% by mass to 30% by mass, based on the whole amount of the friction material, in order to secure sufficient mechanical strength.

The binder to be used in the present invention unifies a friction modifier, the fiber base material and the like which are contained in the friction material to give strength. There is no particular limitation on the binder contained in the friction material in the present invention, and a thermosetting resin usually used as a binder in a friction material can be used.

Examples of the above-mentioned thermosetting resins include straight phenol resins, various phenol resins modified with elastomers or the like, such as acrylic rubber-modified phenol resins, silicone rubber-modified phenol resins and NBR rubber-modified phenol resins, various modified phenol resins such as cashew-modified phenol resins, epoxy-modified phenol resins and alkylbenzene-modified phenol resins, melamine resins, epoxy resins, polyimide resins and the like, and these may be used individually or in combination of two or more kinds thereof.

The content of the binder is preferably 10% by mass or more based on the whole amount of the friction material, in order to secure sufficient mechanical strength and abrasion resistance. Further, as the upper limit thereof, it is more preferably 15% by mass or less.

In the friction material in the present invention, zinc which can be expected to have a rust preventing function is blended as the friction modifier.

Zinc may be either powdery or fibrous. When it is powdery, the average particle diameter thereof is preferably from 1 µm to 10 µm, and more preferably from 1 µm to 7 µm, from the viewpoint of abrasion resistance.

The content of zinc is preferably from 1% by mass to 5% by mass, and more preferably from 2% by mass to 4% by mass. When the blending amount of zinc is 1% by mass or more, it is preferred in terms of the rust preventing function, and in the case of 5% by mass or less, it is preferred in terms of securing the effectiveness.

The pH of the friction material in the present invention is 11.7 or more, preferably 11.8 or more, and particularly preferably 12 or more. When the pH of the friction material is within such a range, the rust preventing performance can be further improved, and the friction material suppressed in the occurrence of noise can be obtained.

The pH of the friction material can be identified by mixing the friction material pulverized and water, allowing the resulting mixture to stand for a predetermined period of time, followed by filtration, and measuring the pH of a filtrate.

In the present invention, in order to control the pH of the whole friction material to 11.7 or more as described above, it is desirable to add calcium hydroxide as a pH control material.

Further, the blending amount thereof can be determined at the discretion of those skilled in the art, based on the set pH. For example, when calcium hydroxide is used, it is preferably from 1% by mass to 10% by mass, and more preferably from 2% by mass to 6% by mass, based on the whole amount of the friction material.

When calcium hydroxide is used, a powder having an average particle diameter of preferably from 5 μm to 100 μm, more preferably from 5 μm to 50 μm is used, thereby being able to continuously maintain the pH of the friction material. Within this range, the pH of the whole friction material can be controlled, and the partial generation of rust on a counterpart material (rotor) can be prevented. The average particle diameter is a value (median value) measured with a laser diffraction particle size analyzer.

In addition to the above, the following inorganic filler, organic filler, abrasive, solid lubricant or the like can be appropriately mixed as the friction modifier contained in the friction material in the present invention.

Examples of the abrasives include alumina, silica, magnesia, zirconia, zirconium silicate, chromium oxide, triiron tetraoxide ($Fe_3O_4$), chromite and the like. Examples of the solid lubricants include graphite, coke, antimony trisulfide, molybdenum disulfide, tin sulfide, polytetrafluoroethylene (PTFE) and the like. Examples of the inorganic fillers include inorganic compounds such as magnesium carbonate, barium sulfate and calcium carbonate, non-whisker-shaped titanic acid compounds such as potassium titanate, lithium titanate, lithium potassium titanate, sodium titanate, calcium titanate, magnesium titanate and magnesium potassium titanate, scale-shaped inorganic substances such as mica and vermiculite, powders of metals such as aluminum, tin and zinc, and the like. These may be used individually or in combination of two or more kinds thereof.

The content of the abrasive is preferably from 1% by mass to 20% by mass based on the whole amount of the friction material, depending on friction properties required, the content of the solid lubricant is preferably from 1% by mass to 15% by mass based on the whole amount of the friction material, and the content of the inorganic filler is preferably from 40% by mass to 60% by mass based on the whole amount of the friction material.

As the organic filler, cashew dust, a rubber component or the like can be used. Examples of the above-mentioned rubber components include tire rubber, natural rubber, acrylic rubber, isoprene rubber, polybutadiene rubber, nitrile-butadiene rubber, styrene-butadiene rubber and the like, and these may be used individually or in combination of two or more kinds thereof. Further, the cashew dust and the rubber component may be used together.

The organic filler is used in an amount of preferably 1% by mass to 15% by mass, more preferably 1% by mass to 10% by mass, based on the whole friction material.

As a specific embodiment of a method for producing the friction material in the present invention, conventional production steps can be used. For example, the friction material can be produced by blending the above-mentioned respective components, and subjecting the resulting blend to steps such as preforming, thermoforming, heating and grinding, according to an ordinary production method.

Steps commonly used in the production of a brake pad including the friction material are shown below:

(a) a step of forming a pressure plate into a predetermined shape by a sheet-metal press;

(b) a step of subjecting the above-mentioned pressure plate to degreasing treatment, chemical conversion treatment and primer treatment;

(c) a step of preparing a preformed body by blending raw materials such as the fiber base material, the friction modifier and the binder, sufficiently homogenizing them by stirring, and performing forming at room temperature and a predetermined pressure;

(d) a thermoforming step of integrally fixing both members of the above-mentioned preformed body and the pressure plate coated with an adhesive, by applying a predetermined temperature and pressure (forming temperature: 130° C. to 180° C., forming pressure: 30 MPa to 80 MPa, forming time: 2 minutes to 10 minutes); and (e) a step of performing after-curing (150° C. to 300° C., 1 hour to 5 hours), and finally performing finishing treatments such as grinding, scorching and painting.

EXAMPLES

The present invention is more specifically described below by examples. However, the present invention should not be limited to these examples alone.

Examples 1 to 4 and Comparative Examples 1 to 5

Preparation of Friction Materials

Steps of preparing a friction material are as follows.

1. Mixing of Raw Materials

Blending raw materials were collectively put in a mixer, followed by mixing and stirring at room temperature for 5 minutes. As the specific raw materials, the raw materials shown below were used. Each specific blending ratio is shown in the table.

Phenol resin: manufactured by Sumitomo Bakelite Co., Ltd.

Calcium hydroxide: manufactured by Chichibu Lime Industry Co., Ltd.

Zinc: manufactured by Sakai Chemical Industry Co., Ltd.

2. Preparation Steps

Each mixture composed of the above-mentioned blending materials was subjected to steps such as preforming, thermoforming, heating and grinding, thereby preparing the friction material.

(1) Preforming

The mixture of the above-mentioned raw materials was put in a mold for preforming press, followed by forming at room temperature under 15 MPa for 10 seconds, thereby preparing a preformed body.

(2) Thermoforming

This preformed body was put in a thermoforming mold, and a metal plate (pressure plate: P/P) previously coated with an adhesive was laminated thereon, followed by thermopressure forming at 150° C. under 45 MPa for 5 minutes.

(3) Heat Treatment

After this thermopressure formed body was heat-treated at 250° C. for 3 hours, grinding was performed so as to have a predetermined thickness of 15 mm, and painting was performed, thereby obtaining the friction material (pad area: 20 cm$^2$).

The following evaluations were performed by using the above-mentioned friction material.

1. pH Test (1) The friction material is pulverized with a drill to prepare a powdery sample.

(2) 6 g of the sample and 200 ml of distilled water are added into a beaker, followed by stirring and allowing to stand for 16 hours.

(3) Filtering is performed while well stirring the sample, and the pH of a filtrate is measured with a pH meter.

2. Seizure Due to Corrosion (Sticking Property)

Evaluation was performed in a vehicle by operations shown below (evaluation was performed in Rr built-in). As a counterpart material (rotor), a cast iron material (FC250) was used.

(1) Burnishing: speed: 40 km/h, deceleration: 1.96 m/s$^2$, pad IBT: 50° C. or lower, the number of times that braking was applied: 30 times (2) Watering: 15 L/min for 3 minutes (3) Braking 3 times in creeping (4) Standing outdoors with a parking brake applied to 11 notch (5) Confirmation of sticking (6) The operations of Nos. (2) to (5) were repeated.

In the test on the first day, the second day and third days, and after standing for three nights, the sound pressure of the vehicle was measured. Further, the rusting ratio (%) on a rotor surface after standing for three nights was calculated.

Rusting ratio (%)=(rotor rusting area of pad contact part)/(pad area)×100

Evaluation of the rusting ratio was carried out by A, B and C, and judgment was made by the rusting ratio according to criteria for judgment as described below.

A: The rusting ratio (%) was less than 50%.

B: The rusting ratio (%) was 50% or more and less than 80%.

C: The rusting ratio (%) was 80% or more.

<Evaluation Results>

The evaluation results of the friction materials are shown in Table 1.

It has been found that, as compared to Comparative Example 1 of the conventional friction material in which copper was blended, in the friction materials of Examples 1 to 4, they show performance equivalent to or more than that thereof for the rusting ratios in the sticking evaluation, even when no copper was blended, and accordingly the sound pressure generated at the time of creep starting is decreased. Further, particularly, in the friction materials of Examples 2 to 4 having pH exceeding 12, the rusting ratios significantly decrease as low as 15% or less, and this shows remarkable synergistic effect by combinations of the blending materials in the present invention.

Furthermore, from a comparison of Comparative Example 5 and Example 1, it has been found that an increase of 1% by mass in the content of the binder improves the strength of the friction material, thereby decreasing the rusting ratio of the rotor, so that the content of the binder also becomes an important requirement.

TABLE 1

| | | | Comparative Example | | | | | Example | | | |
|---|---|---|---|---|---|---|---|---|---|---|---|
| (% by mass) | | | 1 | 2 | 3 | 4 | 5 | 1 | 2 | 3 | 4 |
| Blending Composition | Binder | Phenol Resin | 9 | 9 | 9 | 9 | 9 | 10 | 10 | 10 | 11 |
| | Friction Modifier | Organic Filler | Cashew Dust | 5 | 5 | 5 | 5 | 5 | 5 | 5 | 5 | 5 |
| | | Rubber Dust | 5 | 5 | 5 | 5 | 5 | 5 | 5 | 5 | 5 |
| | | Inorganic Filler | Barium Sulfate | 21 | 26 | 26 | 25 | 25 | 24 | 24 | 23 | 22 |
| | | Potassium Titanate | 21 | 27 | 26 | 26 | 25 | 25 | 24 | 24 | 22 |
| | | Mica | 4 | 4 | 4 | 4 | 4 | 4 | 4 | 4 | 4 |
| | | Calcium Hydroxide | 2 | 2 | 0 | 1 | 2 | 2 | 3 | 4 | 6 |
| | Abrasive | Zirconium Silicate | 3 | 3 | 3 | 3 | 3 | 3 | 3 | 3 | 3 |
| | | Iron Oxide | 4 | 4 | 4 | 4 | 4 | 4 | 4 | 4 | 4 |
| | Solid Lubricant | Graphite | 5 | 5 | 5 | 5 | 5 | 5 | 5 | 5 | 5 |
| | Metal Powder | Zinc | 0 | 0 | 3 | 3 | 3 | 3 | 3 | 3 | 3 |
| | Fiber Base Material | Organic Fiber | Aramid Fiber | 5 | 5 | 5 | 5 | 5 | 5 | 5 | 5 | 5 |
| | | Inorganic Fiber | Bio-Soluble Inorganic Fiber | 5 | 5 | 5 | 5 | 5 | 5 | 5 | 5 | 5 |
| | Metal Fiber | Copper Fiber | 11 | 0 | 0 | 0 | 0 | 0 | 0 | 0 | 0 |
| | Total | | 100 | 100 | 100 | 100 | 100 | 100 | 100 | 100 | 100 |
| | pH of Friction Material | | 11.6 | 11.8 | 10.7 | 11.5 | 11.8 | 11.8 | 12.3 | 12.5 | 12.5 |
| Sticking Evaluation (Vehicle) | Sound Pressure (dB) | First Day | 46.2 | 54.2 | 56.5 | 51.3 | 42.0 | 46.3 | 44.8 | 46.8 | 46.4 |
| | | Second Day | 54.5 | 62.5 | 66.4 | 60.2 | 48.5 | 50.5 | 43.3 | 43.7 | 50.5 |
| | | Third Day | 55.6 | 68.5 | 65.2 | 66 | 45.9 | 51.6 | 45.2 | 48.7 | 48.6 |
| | | Standing for Three Nights | 60.5 | *71.3 | *73.5 | *71.8 | 62.2 | 56.5 | 56.9 | 49.7 | 49.2 |
| | Rusting Ratio (%) | | 45 | 90 | 95 | 100 | 50 | 45 | 15 | 5 | 5 |
| | Evaluation of Rusting Ratio | | A | C | C | C | B | A | A | A | A |

*Not creep startable

While the present invention has been described in detail and with reference to specific embodiments thereof, it will be apparent to those skilled in the art that various changes and modifications can be made therein without departing from the spirit and scope of the present invention. This application is based on Japanese Patent Application No. 2013-234268 filed on Nov. 12, 2013, the contents of which are incorporated herein by reference.

INDUSTRIAL APPLICABILITY

The friction material in the present invention can decrease the generation of rust caused by sticking which becomes liable to occur due to blending no copper fiber, by adjusting the content of the binder to 10% by mass or more, blending calcium hydroxide and zinc, and maintaining the pH of the friction material to 11.7 or more. Accordingly, the occurrence of noise can be suppressed, and friction properties equivalent to that of the case where copper fiber is blended can be secured, so that demand as the friction material containing substantially no copper component and suitable for a wide variety of types of vehicles such as passenger automobiles is expected.

The invention claimed is:

1. A friction material comprising:
a fiber base material;
a friction modifier; and
a binder,
wherein a content of copper is 0.5% by mass or less in terms of copper element,
wherein a content of the binder is 10% by mass or more,
wherein the friction material contains calcium hydroxide and zinc,
wherein the friction material has pH of 113 or more,
wherein a content of the zinc is from 1% by mass to 5% by mass,
wherein the zinc comprises a powder having an average particle diameter in a range of 1 μm to 10 μm,
wherein the calcium hydroxide comprises powder having an average particle diameter in a range of 5 μm to 50 μm,
wherein the fiber base material comprises a bio-soluble inorganic fiber, and
wherein the binder consists of at least one selected from the group consisting of an acrylic rubber-modified phenol resin, a silicone rubber-modified phenol resin, an NBR rubber-modified phenol resin, a cashew-modified phenol resin, an epoxy-modified phenol resin and an alkylbenzene-modified phenol resin.

2. The friction material according to claim 1, wherein a content of the calcium hydroxide is from 2% by mass to 6% by mass.

3. The friction material according to claim 1, wherein the bio-soluble inorganic fiber is at least one selected from the group consisting of $SiO_2$—CaO—MgO-based fiber, $SiO_2$—CaO—MgO—$Al_2O_3$-based fiber and $SiO_2$—MgO—SrO-based fiber.

4. A friction material comprising:
a fiber base material;
a friction modifier; and
a binder,
wherein a content of copper is 0.5% by mass or less in terms of copper element,
wherein a content of the binder is 10% by mass or more,
wherein the friction material contains calcium hydroxide and zinc,
wherein the friction material has pH of 11.7 or more,
wherein a content of the zinc is from 1% by mass to 5% by mass,
wherein the zinc comprises a powder having an average particle diameter in a range of 1 μm to 10 μm,
wherein the calcium hydroxide comprises powder having an average particle diameter in a range of 5 μm to 50 μm,
wherein the fiber base material comprises a bio-soluble inorganic fiber,
wherein the binder consists of at least one selected from the group consisting of a straight phenol resin, an acrylic rubber-modified phenol resin, a silicone rubber-modified phenol resin, an NBR rubber-modified phenol resin, a cashew-modified phenol resin, an epoxy-modified phenol resin and an alkylbenzene-modified phenol resin, and
wherein a content of the fiber base material is 10% by mass or more and 50% by mass or less.

5. The friction material according to claim 4, wherein a content of the calcium hydroxide is from 2% by mass to 6% by mass.

6. The friction material according to claim 4, wherein the bio-soluble inorganic fiber is at least one selected from the group consisting of $SiO_2$—CaO—MgO-based fiber, $SiO_2$—CaO—MgO—$Al_2O_3$-based fiber and $SiO_2$—MgO—SrO-based Fiber.

7. A friction material comprising:
a fiber base material;
a friction modifier; and
a binder,
wherein a content of copper is 0.5% by mass or less in terms of copper element,
wherein a content of the binder is 10% by mass or more,
wherein the friction material contains calcium hydroxide, zinc, and zirconium silicate,
wherein the friction material has pH of 11.7 or more,
wherein a content of the zinc is from 1% by mass to 5% by mass,
wherein the zinc comprises a powder having an average particle diameter in a range of 1 μm to 10 μm,
wherein the calcium hydroxide comprises powder having an average particle diameter in a range of 5 μm to 50 μm,
wherein the fiber base material comprises a bio-soluble inorganic fiber, and
wherein the binder consists of at least one selected from the group consisting of a straight phenol resin, an acrylic rubber-modified phenol resin, a silicone rubber-modified phenol resin, an NBR rubber-modified phenol resin, a cashew-modified phenol resin, an epoxy-modified phenol resin and an alkylbenzene-modified phenol resin.

8. The friction material according to claim 7, wherein a content of the calcium hydroxide is from 2% by mass to 6% by mass.

9. The friction material according to claim 7, wherein the bio-soluble inorganic fiber is at least one selected from the group consisting of $SiO_2$—CaO—MgO-based fiber, $SiO_2$—CaO—MgO—$Al_2O_3$-based fiber and $SiO_2$—MgO—SrO-based fiber.

* * * * *